(12) United States Patent
Shimizu et al.

(10) Patent No.: US 7,180,564 B2
(45) Date of Patent: Feb. 20, 2007

(54) IN-PLANE-SWITCHING LIQUID CRYSTAL DISPLAY FOR LARGE PIXEL TYPE

(75) Inventors: Hidehisa Shimizu, Kanagawa-ken (JP); Mitsuru Ikezaki, Kanagawa-ken (JP); Kaoru Kusafuka, Kanagawa-ken (JP)

(73) Assignee: Chi Mei Optoelectronics Corp. (TW)

( * ) Notice: Subject to any disclaimer, the term of this patent is extended or adjusted under 35 U.S.C. 154(b) by 192 days.

(21) Appl. No.: 10/934,108

(22) Filed: Sep. 3, 2004

(65) Prior Publication Data

US 2005/0099567 A1    May 12, 2005

(30) Foreign Application Priority Data

Sep. 5, 2003    (JP) .............................. 2003-313762

(51) Int. Cl.
*G02F 1/1343* (2006.01)
(52) U.S. Cl. ......................... 349/141; 349/39
(58) Field of Classification Search ................ 349/141, 349/139, 39, 38
See application file for complete search history.

(56) References Cited

U.S. PATENT DOCUMENTS 6,094,250 A * 7/2000 Choi et al. .................. 349/141
6,177,970 B1 * 1/2001 Kim ............................. 349/43

FOREIGN PATENT DOCUMENTS

JP          10-186407          7/1998

* cited by examiner

*Primary Examiner*—Toan Ton
*Assistant Examiner*—David Y. Chung
(74) *Attorney, Agent, or Firm*—Trop, Pruner & Hu, P.C.

(57) ABSTRACT

The invention relates to an in-plane-switching liquid crystal display for large pixel type scarcely producing defects and easily repairing defects. The in-plane-switching liquid crystal display 10 of the invention comprises a plurality of pads 34, and each pad connects to a pixel electrode 42. Besides, each pixel electrode 42 is surrounded by the common electrode 48. When the pixels enlarge, the defects scarcely occur. Even if the defect occurs, the defect can be easily repaired.

2 Claims, 4 Drawing Sheets

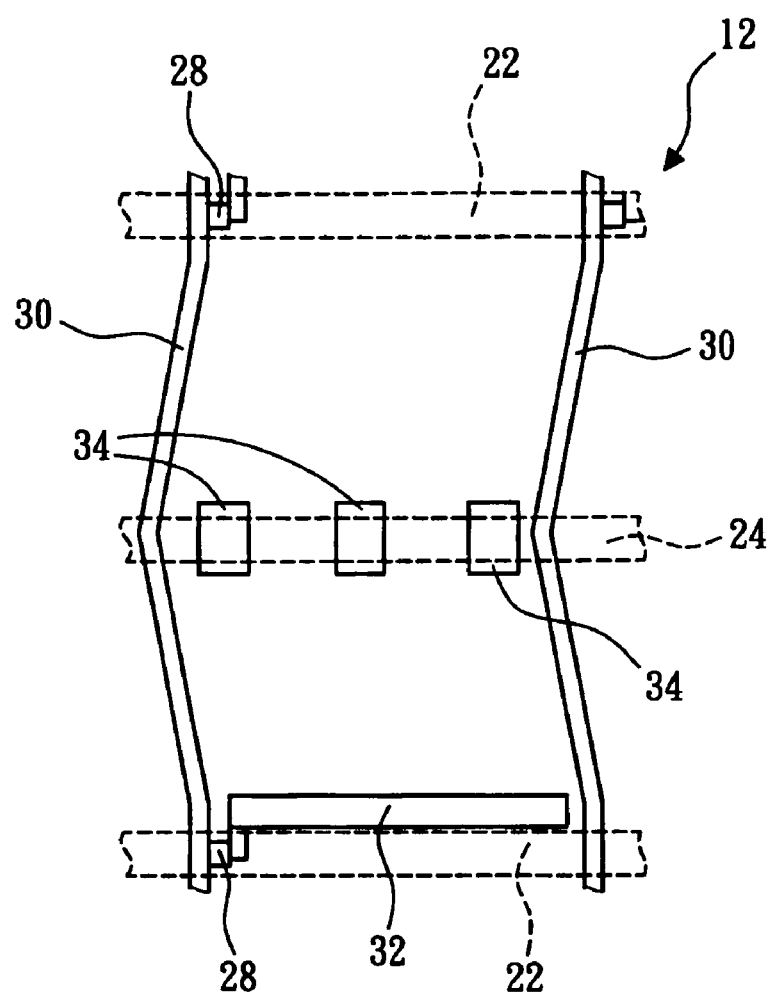
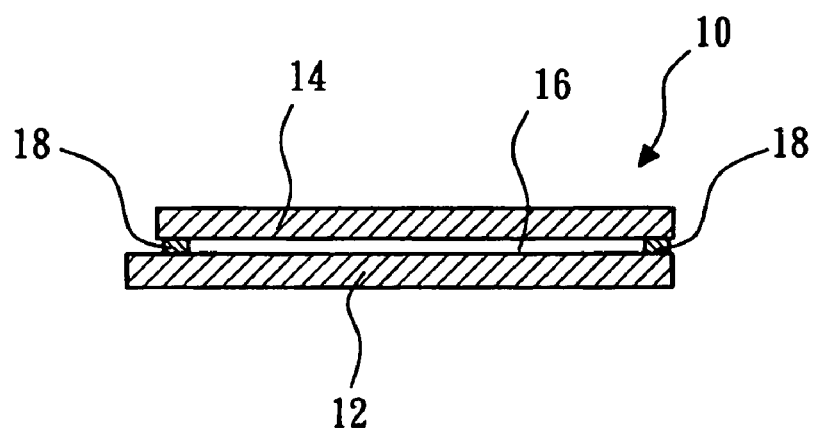
FIG. 4
FIG. 5

IN-PLANE-SWITCHING LIQUID CRYSTAL DISPLAY FOR LARGE PIXEL TYPE

BACKGROUND OF THE INVENTION

1. Field of the Invention

The present invention relates to an in-plane-switching liquid crystal display for large pixel type scarcely producing defects and easily repairing defects.

2. Description of the Related Art

Recently, because liquid crystal display has been utilized in thin type large screen television, liquid crystal displays are becoming large. For the purpose utilizing the liquid crystal display in the television, because many peoples may watch the same television simultaneously, the liquid crystal display must have wide viewing angle compared with the liquid crystal display of personal computer. The in-plane-switching liquid crystal display is one of wide viewing angle liquid crystal display.

The in-plane-switching liquid crystal display comprises an array substrate and a color filter substrate corresponding to the array substrate. There is a distance between the array substrate and the color filter substrate. Besides, liquid crystal molecules fill between the array substrate and the color filter substrate. FIG. 6 shows a conventional array substrate 60 of in-plane-switching liquid crystal display. The array substrate 60 is manufactured according to the following steps (1) to (8). (1) A transparent insulated substrate (glass substrate, etc., is provided. (2) Gate lines 62 and Cs (storage capacity) lines 64 are formed on the glass substrate. (3) A first insulated layer is formed by CVD (chemical vapor deposition) method. (4) TFTs (Thin film transistors) 66, signal lines 68, pads 70 and pixel lines 72 are formed on the same layer. The gate electrodes of TFT 66 are a portion of the gate line. The drain electrodes of TFT 66 are connected to the signal lines 68. The pads 70 are corresponding to the Cs lines 64, and the insulated layer is between the pads 70 and the Cs lines 64. The pixel lines 72 are used to connect the pads 70 and the source electrodes. (5) A second insulated layer is formed on the TFT 66, signal lines 68, pads 70 and pixel lines 72. (6) Through holes 74 are formed on the second insulated layer and disposed above the corresponding position of the pads 70. (7) Pixel electrodes 76 and common electrodes 78 are formed. (8) An alignment layer is formed on the pixel electrodes 76 and the common electrodes 78.

The pixel electrodes 76 connect to the pads 70 via the through hole 74, and are of stripe shape in the pixel. The number of the pixel electrodes is arbitrary. The common electrodes 78 are of a strip shape, and are formed on the same layer of the pixel electrodes 76. The pixel electrodes 76 are parallel to the common electrodes 78. The pixel electrodes 76 and the common electrodes 78 induce electric field parallel to the glass substrate, and the intensity of the electric field affect the alignment of the liquid crystal molecules.

Furthermore, the common electrodes 78 are also formed on the peripheral area of the pixel, and a portion of the common electrodes 78 overlap the signal lines 68 so that the common electrodes 78 can shield the electric field inducing by the signal lines 68 to prevent the malfunction of liquid crystal molecules. On the inside area of the pixel, the common electrodes 78 that are corresponding to the pixel electrodes 76 do not overlap the signal lines 68 and disconnected in the middle of the pixel.

The resolution of the television is fixed. Therefore, when the liquid crystal display is utilized in the television, the liquid crystal display must match the television. That is, when televisions are becoming large and liquid crystal displays are also becoming large, each pixel is becoming large at the fixed number of pixels.

The distance between the pixel electrodes 76 and the common electrodes 78 can be determined by the characteristic of the liquid crystal molecules. When the size of the pixel enlarges, the number of the pixel electrodes 76 and the number of common electrodes 78 in the pixel must increase. Therefore, the number of the disconnected common electrodes 78 increases, and the resistance of the common electrodes 78 will increase so that the interference will lower the quality of the screen in showing the picture.

All of the pixel electrodes 76 connect to the pads 70 via the through holes 74 on the second insulated layer. Sometimes, because one through hole 74 is formed defectively, the connection between the pixel electrode 76 and the pad 70 will be bad. Besides, when the first insulated layer has a broken hole during forming the Cs line 64, the voltage potential of the pixel electrode 76 will be the same as that of the Cs line 64. It cannot apply the predetermined voltage to all the pixel electrodes 76 of the pixel, and the whole pixel becomes defective.

As shown in FIG. 7, there are a plurality of through holes 74 on the second insulated layer and above the pads 70, and a plurality of pixel electrodes 76 connect to the pad 70 via the through holes 75 respectively to form the array substrate 61 of the in-plane-switching liquid crystal display. Even if one of the through holes 75 has defect, only the pixel electrode 76 connected to the defected through hole 74 becomes bad and the other pixel electrodes 76 can still work normally. However, when one of the pixel electrodes 76 change into high resistance characteristic, the angle of the AC current with square waveform flown to the pixel electrode 76 may become a circular shape and induce DC current component. After some time, the DC current may flow to the adjacent pixel electrode 76 by the alignment layer. After the liquid crystal display is used for a few hours, the voltage potentials of the two pixel electrodes 76 are the same so that the whole pixel cannot be switched.

Given the above, because the size of the pixel increases, various problems can easily occur. When a problem occurs, it will lower the quality of the liquid crystal display. Furthermore, the problem causes bad manufacturing yield of the liquid crystal display.

Prior art 1 discloses a liquid crystal display having large open ratio by decreasing a leakage electric field form the data line. A portion of the common electrode overlaps on the data line to prevent the leakage electric field. However, prior art 1 only discloses that the leakage electric field is shielded to enlarge the open ratio, and does not disclose that the defect caused by the large type pixel can be repaired. Prior art 1 is Japan Patent Publication No. 10-186407 (as shown in FIG. 1).

SUMMARY OF THE INVENTION

The purpose of the present invention is to provide an in-plane-switching liquid crystal display for large pixel type scarcely producing defects and easily repairing defects.

The in-plane-switching liquid crystal display of the invention comprises: a transparent insulated substrate; a plurality of gate lines formed on the transparent insulated substrate and being parallel to each other; a plurality of Cs lines formed between the gate lines; an insulated layer formed on the transparent insulated substrate and covering the gate lines and the Cs lines; a transistor formed on the insulated layer and having a drain electrode, a source electrode, and a gate electrode being part of the gate line; a signal line being perpendicular to the gate lines with said insulated layer therebetween, and connected to the drain electrode; a pixel line formed on the insulated layer in a direction the same as the gate lines and connected to the source electrode; a plurality of pads corresponding to the Cs line with said insulated layer therebetween; a resin layer formed on the insulated layer and covering the transistor, the signal line, the pixel line and the pads; a plurality of first through holes formed in the resin layer that is formed on the pads; a plurality of second through holes formed in the resin layer that is formed on the pixel line, wherein the number of the second through holes is equal to that of the first through holes; and a plurality of pixel electrodes extending the second through holes, the resin layer and the first through holes to connected the signal lines and the pads. The in-plane-switching liquid crystal display of the invention has a plurality of pads respectively connected to the pixel electrodes.

The in-plane-switching liquid crystal display of the invention further comprises: a first common electrode and a second common electrode, the first common electrode formed on the resin layer and overlapped the corresponding position of the gate lines and the signal line; the second common electrode formed on the resin layer, connected to the first common electrode, and the first common electrode and the second common electrode surrounding the pixel electrode. Because the first common electrode and the second common electrode surround the pixel electrode, the second common electrode is not disconnected.

The pixel electrodes are formed on the surface of the resin layer, and extend in a reverse direction extending from the first through hole to the second through hole.

The in-plane-switching liquid crystal display of the invention has a plurality of pads respectively connected to the pixel electrodes. When one gate line or pad is bad, the gate line is cut or the pad and the Cs line are welded. Therefore, the invention does not repair the whole pixel, but can repair per a unit of each sub-pixel.

The first common electrode and the second common electrode surround the pixel electrode, and the second common electrode is not disconnected in the middle section. Accordingly, the invention can prevent the interference caused by high resistance of the common electrode.

BRIEF DESCRIPTION OF THE DRAWINGS

FIGS. 2a–2b illustrate section views of the array substrate of the in-plane-switching liquid crystal display, wherein FIG. 2a is a section view from X–X' section in FIG. 1, FIG. 2b is a section view from Y–Y' section in FIG. 1.

FIG. 4 shows signal line, TFT, pixel line and pad on the insulated layer.

FIG. 5 illustrates a section view of the in-plane-switching liquid crystal display.

DETAILED DESCRIPTION OF THE INVENTION

Figure 1:
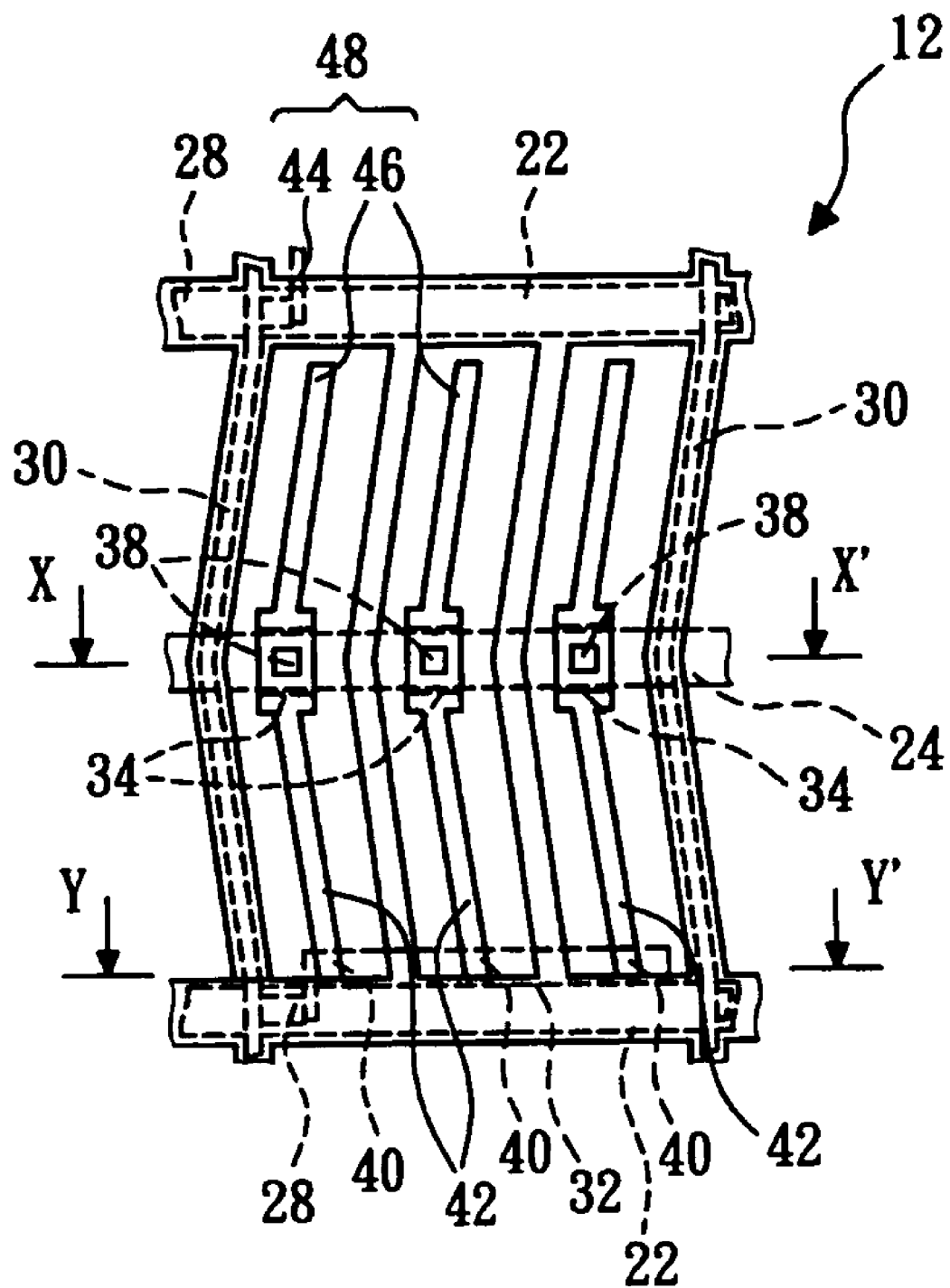
FIG. 1 illustrates a front view of the array substrate of the in-plane-switching liquid crystal display, according to the invention.

The figures illustrate the embodiment of the in-plane-switching liquid crystal display according to this invention. Referring to FIG. 5, an in-plane-switching liquid crystal display 10 comprises an array substrate 12 and a color filter substrate 14 corresponding to the array substrate 12. There is a distance between the array substrate 12 and the color filter substrate 14. The sealant 18 is used to seal liquid crystal molecules 16 between the array substrate 12 and the color filter substrate 14. The liquid crystal molecules 16 are driven to show picture. The array substrate 12 having pixel electrodes to drive the liquid crystal molecules 16 is described as follows.

(The First Embodiment)

Figure 2A:
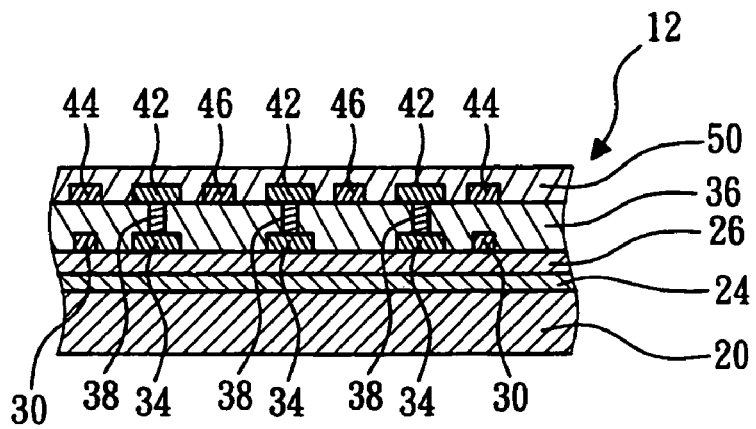
Figure 2B:
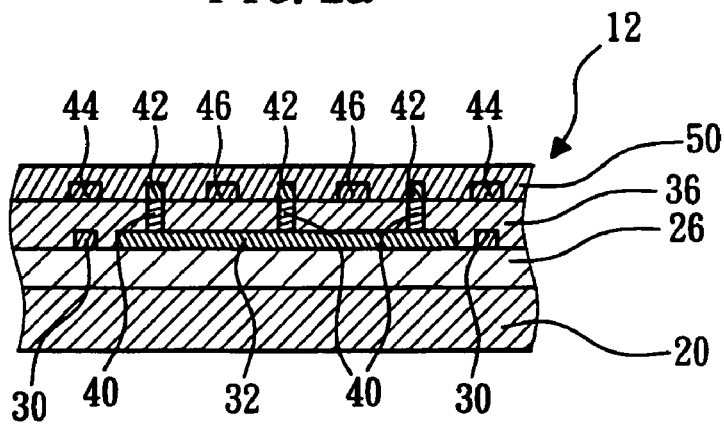

As shown in FIGS. 1, 2a and 2b, the array substrate 12 has a plurality of layers on the glass substrate 20, and has the patterned lines in the longitudinal direction and the horizontal direction. The glass substrate 20 can be any other transparent insulated substrate. Besides, the circuit pattern that comprises gate lines 22, shown in FIG. 1, continues in a longitudinal direction or a horizontal direction.

Figure 3:
FIG. 3 shows Gate line and Cs line on the glass substrate.
Figure 3:
Figure 3:
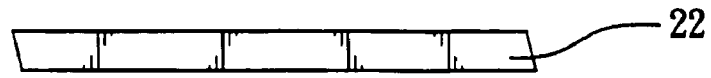
Figure 6:
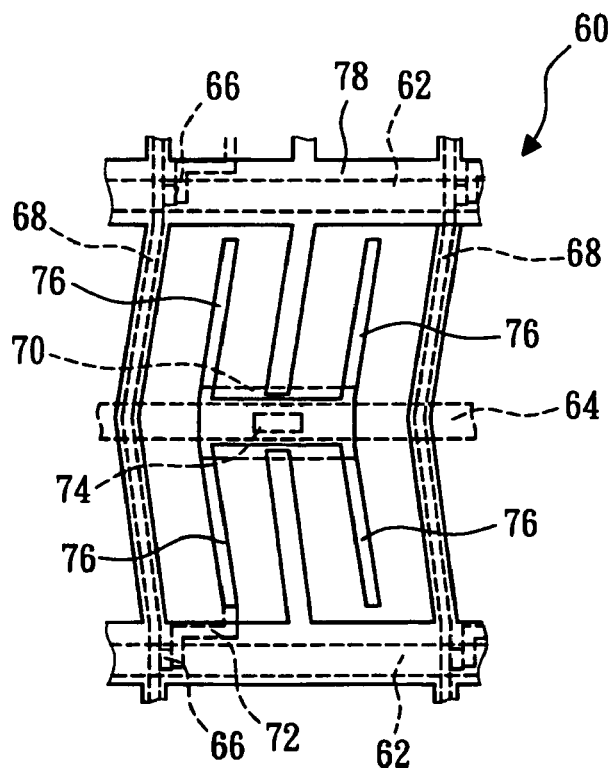
FIG. 6 illustrates a front view of the array substrate of the conventional in-plane-switching liquid crystal display.
Figure 7:
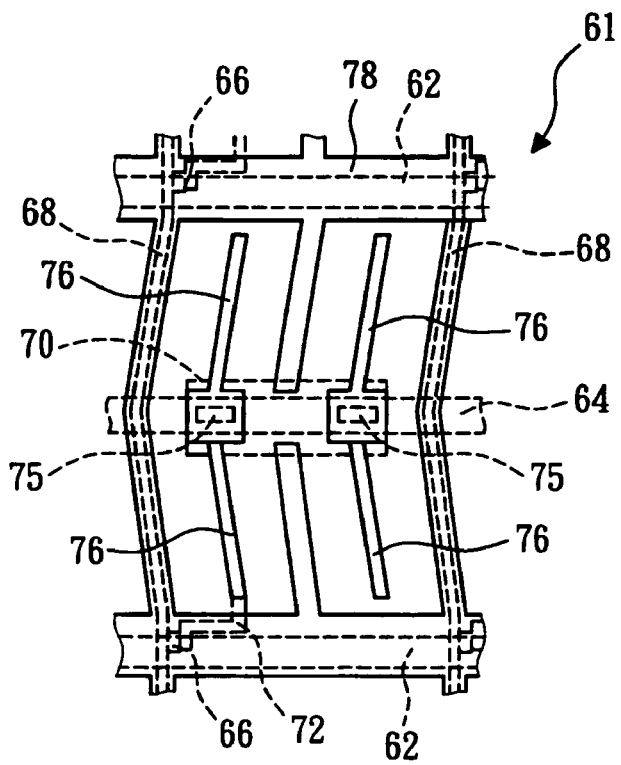
FIG. 7 illustrates a front view of the array substrate having a plurality of pads, according to the conventional in-plane-switching liquid crystal display.

As shown in FIGS. 2a, 2b and 3, there is a plurality of gate lines 22 formed on the glass substrate 20. The gate lines 22 are parallel to each other. For example, if the glass substrate 20 is a rectangle with a long width, the gate lines 22 are formed in a transverse direction. Furthermore, the Cs lines are formed between the gate lines 22, and are parallel to the gate lines 22.

An insulated layer 26 is formed on the glass substrate 20, and covers the gate lines 22 and the Cs lines 24. The insulated layer 26 is formed by utilizing the CVD technique. The material of the insulated layer may be $SiO_x$ or $SiN_x$.

As shown in FIGS. 2a, 2b and 4, a plurality of signal lines 30 are formed on the insulated layer, and are parallel to each other. The signal lines 30 cross the gate lines 22 in space, and the signal lines 30 are above the gate lines 22. The insulated layer 26 is between the signal lines 30 and the gate lines 22. The signal lines 30 are perpendicular to the gate lines 22. The signal lines 30 and the gate lines 22 are on different layers, and are formed as a matrix. In a front view, an area surrounded by the signal lines 30 and the gate lines 22 is a pixel. Therefore, the in-plane-switching liquid crystal display 10 has a plurality of pixels. The signal lines are made of aluminum, etc. Besides, although the signal lines 30 are shown to be of a mountain shape ("<" shape) in the figure, the signal lines 30 are taken as straight line for convenience.

TFT 28 is disposed at the intersection between the gate lines 22 and the signal lines 30. TFT 28 is the same as the conventional TFT, and has a drain electrode, a source electrode and a gate electrode to be a switch element. The TFT 28 is set above the gate lines 22, and a portion of the gate lines 22 is taken as the gate electrode. The signal lines 30 connect to the drain electrode. The gate line 22 is applied with voltage to turn on the TFT 28. As the TFT 28 is turned on, the signal line 30 is applied a predetermined voltage, and the predetermined voltage is applied to the pixel electrode so as to drive the liquid crystal molecules 16.

In the pixel, a pixel line 32 is formed on the insulated layer 26. The pixel line 32 has a terminal connected to the source electrode. The pixel line 32 is formed in the same direction as the gate lines 22, but the pixel line 32 does not overlap the gate lines 22. When the pixel line 32 overlaps the gate lines 22, the common electrode will connect to the pixel electrode on the same layer. The pixel line 32 is a path for providing the predetermined voltage from the source electrode of the TFT 28 to the pixel electrode.

In the pixel, a plurality of pads 34 are formed on the insulated layer 26 that is above the Cs line 24. The Cs line 24 corresponds to the pads 34, and the insulated layer 26 is between the Cs line 24 and the pads 26 to form a storage capacity. The storage capacity is used to be the capacitor of holding the voltage of the pixel. The number of the pads 34 is the same as the number of the pixel electrodes. The conventional in-plane-switching liquid crystal display utilizes one pad connected to all pixel electrodes. However, the in-plane-switching liquid crystal display of the invention utilizes one pad connected to one pixel electrode.

As shown in FIGS. 2a–2b, a resin layer (polymer) 36 is formed on the insulated layer 26 and covers the signal line 30, the TFT 28, the pixel line 32 and the pads 34. By disposing the resin layer 36, the common electrode overlaps the signal line 30 so as to raise the open ratio of the liquid crystal display.

A plurality of first through holes 38 are formed in a portion of the resin layer 36 that is formed on the pads 34 respectively. Furthermore, a plurality of second through holes 40 are formed in the resin layer 36 that is formed on the pixel line 32. The number of the second through holes 40 is equal to the number of the first through holes 38.

As shown in FIG. 1, the pixel electrodes 42 are used to connect the pixel line 32 and pads 34. According to the arrangement of the second through holes 40, the surface of the resin layer 36 and the first through holes 38, the pixel line 32 connects to the pads 34 by the pixel electrodes 42. The pixel electrodes 42 are formed on the surface of the resin layer 36, and extend in a reverse direction extending from the first through holes 38 to the second through holes 40. The pixel electrodes 42 are made of ITO (indium tin oxide).

On the surface of the resin layer 36, a first common electrode 44 is formed and overlaps the corresponding position of the gate lines 22 and the signal line 30. A second common electrode 46, which is connected to the first common electrode 44, is formed, and the first common electrode 44 and the second common electrode 46 surround the pixel electrode 42. The first common electrode 44 and the second common electrode 46 are formed as a common electrode 48. The pixel electrodes 42 are parallel to the common electrode 48 on the resin layer 36. In the conventional in-plane-switching liquid crystal display, the common electrodes are disconnected inside the pixel area. However, according to the in-plane-switching liquid crystal display of the invention, the common electrode 48 is not separated but is integrated to one line inside the pixel area.

As shown in FIG. 1, the common electrode 48 surrounds the pixel electrodes 42. An area surrounded by the common electrode 48 is a sub-pixel having a pixel electrode 42. The pixel has a plurality of sub-pixels, for example, there are three sub-pixels in the pixel of FIG. 1.

An alignment layer 50 is formed on the resin layer 36 having pixel electrode 42 and the common electrode 48. The above structures are used to form the array substrate 12 of the in-plane-switching liquid crystal display of the invention. The in-plane-switching liquid crystal display 10 of the invention utilizes the deposition method, for example CVD method, to deposit the material and the conventional sputter technique.

As given above, according to the invention, each pixel electrode 42 connects to a pad 34. When one pad 34 and the Cs line 24 are short-circuited, the whole pixel becomes a bright point. Therefore, laser can cut the pixel electrode 42 connecting short-circuited pad 34. The cut position is near the second through hole 40. Only the sub-pixel having the cut pixel electrode 42 will become a dark point, and the other sub-pixels have no influence. That is, the in-plane-switching liquid crystal display of the invention can be repaired per a unit of each sub-pixel.

On the contrary, when the pixel electrode 42 is cut in manufacturing the in-plane-switching liquid crystal display, it uses laser to weld the pad 34 of the pixel electrode 42 and the Cs line 24. The situation will be the same as the above case, and the sub-pixel can be repaired.

Furthermore, by cutting the defective portion of the pixel electrode 42, the potential of the normal portion of the pixel electrode 42 will decrease the storage capacity to produce DC current. The sub-pixel having DC current can raise the predetermined voltage to compensate the brightness due to the dark point of the repaired sub-pixel.

Inside the pixel area, the common electrode 48 surrounds a pixel electrode 42. That is, the pads 34 and the first through holes 38 do not obstruct the common electrode 48, and the common electrode 48 does not interrupt in the middle section. Even if the pixel enlarges, the resistance of the common electrode 48 does not become high, and the crosstalk described in the prior art scarcely occurs.

Although the invention has been described with respect to the embodiment thereof, it should be realized that the invention is not limited by the embodiment. Additionally, the improvements, various changes and modifications may be made therein by the one skilled in the art without departing from the spirit and scope of the invention.

What is claimed is:

1. An in-plane-switching liquid crystal display, comprising:

a transparent insulating substrate;

a plurality of gate lines formed on said transparent insulating substrate and being parallel to each other;

a plurality of storage capacity lines formed between the gate lines;

an insulating layer formed on said transparent insulating substrate and covering said gate lines and said storage capacity lines;

a transistor formed on said insulating layer and having a drain electrode, a source electrode, and a gate electrode being part of a corresponding gate line;

a signal line being perpendicular to said gate lines with said insulating layer therebetween, and connected to said drain electrode;

a pixel line formed on the insulating layer in a same direction as said gate lines and connected to said source electrode;

a plurality of pads corresponding to said storage capacity line with said insulating layer therebetween;

a resin layer formed on said insulating layer and covering said transistor, said signal line, said pixel line and said pads;

a plurality of first through holes formed in said resin layer that is formed on said pads;

a plurality of second through holes formed in said resin layer that is formed on said pixel line, wherein the number of said second through holes is equal to the number of said first through holes; and a plurality of pixel electrodes extending from said second through holes over the surface of said resin layer to said first through holes so as to connect the pixel line and the pads.

2. The display according to claim 1, further comprising:

a first common electrode formed on said resin layer above said gate lines and said signal line; and a second common electrode formed on said resin layer and connected to said first common electrode, said first common electrode and said second common electrode surrounding said pixel electrode.

* * * * *